3,036,027
COMPOSITION COMPRISING HALOGENATED BUTYL RUBBER, A METAL THIOCARBAMATE AND A DIMETHYLOL PHENOL, PROCESS FOR VULCANIZING SAME, AND VULCANIZED PRODUCT THEREOF
George A. Ziarnik, Elizabeth, N.J., assignor to Esso Research and Engineering Company, a corporation of Delaware
No Drawing. Filed Feb. 27, 1959, Ser. No. 795,912
18 Claims. (Cl. 260—43)

This invention relates to rubbery polymeric compositions which are halogenated copolymers of isoolefins and multiolefins and to the preparation and vulcanization of such compositions and more particularly to improved methods for curing halogenated butyl rubber in the absence of added sulfur or zinc oxide with minor proportions of a combination of a polymethylol phenol and a metal thiocarbamate.

Copolymers of the above general type, especially where the copolymer contains about 85 to 99.5% (preferably about 95 to 99.5%) of a $C_4$ to $C_7$ or $C_8$ isoolefin such as 2-methyl-1-butene, 3-methyl-1-butene or isobutylene with about 15 to 0.5% (preferably 5 to 0.5 weight percent) of a multiolefin of about 4 to 14, preferably about 4 to 6 carbon atoms and having a Staudinger molecular weight of between about 20,000 and 300,000, are commonly referred to in patents and literature as "butyl rubber" or GR-I rubber (Government Rubber-Isobutylene) and, for example, is referred to as "butyl rubber" in textbook "Synthetic Rubber" by G. S. Whitby. The preparation of butyl type rubber is described in U.S. Patent 2,356,128 to Thomas et al. as well as in technical literature. In general, the multiolefinic component of the rubber comprises such multiolefins as myrcene, alloocimene or dimethallyl or preferably a conjugated diolefin such as isoprene, butadiene, dimethyl butadiene, piperylene, etc. The reaction product of isobutylene and isoprene is preferred. Butyl rubber preferably has a mole percent unsaturation of between about 0.5 to 15.0.

Halogenated butyl-type rubbery copolymers are known to be vulcanizable with a combination of a polymethylol phenol and zinc oxide. It is also known that unmodified butyl rubber may be cured into satisfactory vulcanizates by a combination of a polymethylol phenol and certain metal halides or halogenated polymers but that the presence of metal thiocarbamates adversely affects the cure.

In accordance with the present invention, it has now been discovered that halogenated butyl rubber may be effectively vulcanized in the absence of sulfur or zinc oxide by a combination of a polymethylol phenol and a metal thiocarbamate; this combination being totally ineffective for curing unmodified butyl rubber.

In practicing the present invention, 100 parts by weight of halogenated butyl rubber are compounded, in the absence of sulfur and zinc oxide, with an admixture comprising about 0.05 to 25, advantageously about 0.1 to 20, and preferably about 0.2 to 15 parts by weight of at least one polymethylol phenol and about 0.01 to 15, advantageously about 0.05 to 10, and preferably about 0.1 to 5.0 parts by weight of at least one metal thiocarbamate. Optionally, the 100 parts by weight of halogenated butyl rubber may also be compounded with about 10 to 100, preferably 20 to 80 parts by weight of a filler such as clays or carbon blacks, with or without the addition of such conventional compounding agents as antioxidants such as phenyl beta-naphthylamine, antitack agents such as stearic acid, resins, plasticizers, etc. The resulting compounded stock is then cured by heating the same for about 0.5 minute to 5 hours, preferably for about 2 minutes to 2 hours at a temperature level of between about 150° to 450° F., advantageously at about 200° to 400° F., and preferably at about 250° to 350° F. to produce a vulcanizate having excellent tensile strength, modulus, and elongation.

In producing halogenated butyl rubber to be vulcanized in accordance with the present invention, unmodified, unvulcanized butyl rubber is carefully halogenated so as to contain about at least 0.5 weight percent (preferably at least about 1.0 weight percent) combined halogen but not more than about "X" weight percent combined fluorine or chlorine or 3 "X" weight percent combined bromine or iodine wherein:

$$X = \frac{M_3 L}{(100-L)M_1 + L(M_2+M_3)} \times 100$$

and:

$L$=mole percent of the multiolefin in the polymer
$M_1$=molecular weight of the isoolefin
$M_2$=molecular weight of the multiolefin
$M_3$=atomic weight of halogen Restated, there should be at least about 0.5 weight percent of combined halogen in the polymer but not more than about one atom of fluorine or chlorine or three atoms of bromine or iodine combined in the polymer per molecule of multiolefin present therein; i.e., not more than about one atom of combined fluorine or chlorine or three atoms of combined bromine or iodine per double bond in the polymer.

Suitable halogenating agents which may be employed are gaseous chlorine, liquid bromine, iodine monochloride, hydrogen fluoride, alkali metal hypochlorites, sodium hypobromite, $C_4$ to $C_{10}$ tertiary alkyl hypochlorites or hypobromites, sulfur chlorides or bromides (particularly oxygenated sulfur chlorides or bromides), pyridinium chloride perchloride, N-bromo-succinimide, N-chloroacetanilide, tri-bromophenol bromide, N-chloroacetamide, N,N'-dimethyl-5,5-dichloro or dibromo hydantoin, and other common halogenating agents.

The halogenation is generally conducted at about −50° to about +200° C., advantageously at about 10° to 65° C., preferably at about 20° to 50° C. (room temperature generally being satisfactory), depending upon the particular halogenation agent, for about one minute to several hours. The pressure is not critical and may vary from about 0.5 to 400 p.s.i.a.; atmospheric pressure being satisfactory. The halogenation conditions are regulated to halogenate the rubbery copolymer to the extent above-mentioned.

The halogenation may be accomplished in various ways. For instance, the solid copolymer may be halogenated with a solid halogenating agent, preferably at elevated temperatures. Another process comprises preparing a solution of the copolymer in a suitable inert liquid organic solvent such as a $C_3$ to $C_{10}$ or preferably a $C_5$ to $C_8$ inert hydrocarbon or halogenated derivatives of saturated hydrocarbons, examples of which are hexane, heptane, naphtha, mineral spirits, cyclohexane, alkyl substituted cycloparaffins, benzene, chlorobenzene, chloroform, trichloroethane, carbon tetrachloride, mixtures thereof, etc. and adding thereto gaseous chlorine, liquid bromine, or other halogenating agent, which may optionally be in solution, such as dissolved in an inert hydrocarbon, an alkyl chloride, carbon tetrachloride, etc.

The concentration of the butyl rubber in the solvent will depend upon the type of reactor, molecular weight of the butyl rubber, etc. In general, the concentration of a butyl rubber having a viscosity average molecular weight of about 200,000 to about 1,500,000, if the solvent is a substantially inert hydrocarbon, will be between 1 and 30% by weight, preferably about 5 to 20%. If chlorine gas is employed to chlorinate such a rubbery solution, it may also be diluted with up to about 50 times its volume, preferably about 0.1 to 5.0 times its volume of an inert gas such as nitrogen, methane, ethane, carbon dioxide, etc.

The resulting halogenated butyl rubber polymer may be recovered in various manners. The halogenated polymer may be precipitated with acetone or any other known non-solvent for the halogenated butyl rubber and dried under about 1 to 760 millimeters or higher of mercury pressure absolute at about 0° to 180° C., preferably at about 50° to 150° C. (e.g., 70° C.). Other methods of recovering the halogenated butyl rubber polymer from the hydrocarbon solution of the same are by conventional spray or drum drying techniques. Alternatively, the halogenated butyl rubber-containing solution may be injected into a vessel containing agitated water heated to a temperature sufficient to flash off the hydrocarbon solvent and form an aqueous slurry of the halogenated butyl rubber. The halogenated butyl rubber may then be separated from this slurry by filtration, dried and recovered as a "crumb" or as a dense sheet or slab by conventional milling and/or extruding procedures. The halogenated copolymer formed advantageously has a viscosity average molecular weight between about 200,000 and 2,500,000 and a mole percent unsaturation of between about 0.5 and 15.0, preferably about 0.6 to 5.0.

The polymethylol phenols, suitable for use in the present invention, are typically made by reacting a meta or preferably a para-substituted phenol having the two ortho positions unoccupied, with a considerable molar excess of formaldehyde, the molar ratio of formaldehyde to phenol typically being 2:1, in the presence of a strong alkaline catalyst, especially on alkali metal hydroxide such as NaOH, which is subsequently neutralized. Typically the mixture of the phenol, formaldehyde and alkaline catalyst is heated at a suitable temperature of about 10° to 100° C. during the first stage of the reaction involving the formation of the phenol methylol, i.e., the meta or para-substituted 2,6-dimethylol phenol. This material, which is a phenol dialcohol, may be isolated by acidification of the mixture and separation of the oily layer which may then be advanced to higher molecular weight form by heating at say about 70° to 175° C. This higher molecular weight form is oil-soluble and heat-reactive, and has the advantages that it is more reactive with the butyl rubber than the lower molecular weight form. Separation of the phenol dialcohol may be omitted, in which case the reaction is carried past the monomer stage to the resinous stage, whereupon the mixture is neutralized and water is removed to give the resinous material. In any case care should be taken to stop while the resin is in the soluble (in conventional organic solvents and drying oils) and fusible state.

The phenol from which the dimethylol phenol is made generally has a hydrocarbon group in the position which is meta or especially para to the phenolic hydroxyl; examples being alkyl groups, especially alkyl groups having from 3 to 20 carbon atoms, tertiary-butyl and tertiary-octyl (alpha, alpha, gamma, gamma-tetramethyl butyl) being especially preferred among the lower alkyls (8 carbon atoms or less), cyclo-alkyl groups, aryl groups, such as phenyl, and aralkyl groups such as benzyl and cumyl. Examples of suitable dimethylol phenols that may be used in accordance with the invention either in the polymeric or monomeric form are as follows:

2,6-dimethylol-4-methyl phenol;
2,6-dimethylol-4-tertiary butyl phenol;
2,6-dimethylol-3-dodecyl phenol;
2,6-dimethylol-4-octyl phenol;
2,6-dimethylol-4-phenyl phenol;
2,6-dimethylol-5-decyl phenol;
2,6-dimethylol-4-benzyl phenol;
2,6-dimethylol-4-(alpha, alpha-dimethyl benzyl) phenol; and/or
2,6-dimethylol-4-cyclohexyl phenol.

Suitable metal thiocarbamates for the purposes of the present invention include, among others, group I to group VIII metal alkyl thiocarbamates, advantageously group I to group VI metal poly $C_1$ to $C_8$ alkylpolythiocarbamates and preferably group I, II, IV, V or VI metal di $C_1$ to $C_4$ alkyl dithiocarbamates. Typical metal thiocarbamates include, among others, copper dimethyl dithiocarbamate, zinc dibutyl dithiocarbamate, lead dimethyl dithiocarbamate, bismuth dimethyl dithiocarbamate, selenium diethyl dithiocarbamate, tellurium diethyl dithiocarbamate, mixtures thereof, etc.

In order to more fully illustrate the present invention, the following experimental data are given:

BROMINATED BUTYL RUBBER "A"

A copolymer of 97.5% by weight isobutylene and 2.5% by weight isoprene, having a viscosity average molecular weight of 290,000, was dissolved in hexane to form a 10% solution. To this polymer solution, a 30 weight percent (based on the polymer) of liquid bromine was added and reacted for 40 minutes with the polymer at room temperature. The resulting brominated polymer was precipitated with acetone, collected and redissolved in hexane three times and ultimately dried and analyzed and found to have a viscosity average molecular weight of 280,000 and to claim 1.8% chlorine based on the polymer. The physical characteristics of vulcanizates of this interpolymer, when cured by 2.0 parts each of 2,6-dimethylol-3-dodecyl phenol and lead diethyl dithiocarbamate, were excellent in that they exhibited tensile strengths of above 2,300 p.s.i. and extension moduli of above 1,000 p.s.i.

HALOGENATED RUBBERS "B" TO "L"

Other examples of halogenated isoolefin-multiolefin copolymers which may be used are tabulated hereinafter, the amount of isoolefin and multiolefin in copolymer, halogenation agent, and amount of halogen combined in the copolymer being as follows:

| Halogenated Rubber | Isoolefin (Percent)[1] | Multiolefin (Percent)[1] | Halogenation Agent | (Percent) Halogen in the Rubber[1] |
|---|---|---|---|---|
| B | Isobutylene (98) | Isoprene (2) | $SO_2Cl_2$ | 1.2 chlorine. |
| C | Isobutylene (95) | Isoprene (5.0) | $Cl_2$ in $CCl_4$ | 2.5 chlorine. |
| D | Isobutylene (94) | Cyclopentadiene (6) | $Cl_2$ in $CCl_4$ | 2.0 chlorine. |
| E | Isobutylene (92) | Myrcene (8.0) | Iodine monochloride | 1.2 iodine. |
| F | 2-methyl-butene-1 (95) | Isoprene (5) | $Cl_2$ in Hexane | 1.5 chlorine. |
| G | 3-methyl-butene-1 (96) | Butadiene (4) | $Cl_2$ in Hexane | 1.9 chlorine. |
| H | Isobutylene (98) | 1-vinyl cyclohexene-3 (2) | $Cl_2$ in $CCl_4$ | 0.8 chlorine. |
| I | Isobutylene (92) | Butadiene (8) | hydrogen fluoride | 1.1 fluorine. |
| J | Isobutylene (85) | Isoprene (15) | gaseous chlorine | 6.6 chlorine. |
| K | Isobutylene (98) | Isoprene (2) | N,N'-dichloro-5,5-dimethyl hydantoin. | 1.1 chlorine. |
| L | Isobutylene (98) | Isoprene (2) | liquid bromine | 2.3 bromine. |

[1] NOTE.—(Percent) in all instances is percent by weight.

CHLORINATED BUTYL RUBBER "M"

An additional run was made chlorinating a commercial isobutylene-isoprene butyl rubber dissolved in benzene. The butyl rubber had a Mooney viscosity at 212° F. for 8 minutes of 75, and a mole percent unsaturation of 1.6. The chlorination of a solution of the uncured butyl rubber was conducted in a 500-gallon glass-lined Pfaudler reactor equipped with an agitator, baffle, submersed stainless steel sparger ring and a conduit leading into the ring.

Gaseous chlorine was continuously added to the butyl rubber solution over a period of one-half hour at a temperature level of 30° C. and under atmospheric pressure. The chlorine was added to the reactor through the conduit via the sparger ring. The chlorination was then terminated and the solution containing the chlorinated butyl rubber formed was agitated for an additional 20 minutes. The resulting solution of chlorinated butyl rubber was then water washed three times to remove dissolved hydrogen chloride.

The absolute amount of butyl rubber, benzene solvent and gaseous chlorine added, as well as the calculated percent of added chlorine based on polymer and resulting percent of chlorine combined in the polymer were as follows:

|  | Pounds | Percent in composition |
|---|---|---|
| Butyl rubber | 170 | 98.65 |
| Benzene solvent | 1,540 | |
| Chlorine added | 4.8 (i.e. 2.8%) | 1.35 |

The resulting water-washed solution containing the stabilized, chlorinated butyl rubber "M" was then recovered by injecting the solution into an agitated aqueous slurry containing calcium stearate and a small amount of the non-ionic wetting agent of the aliphatic polyoxyethylene ether type such as Tergitol NPX (e.g., Sterox AJ) in an amount of 0.7 pound of the calcium stearate per 100 pounds of chlorinated butyl rubber as a dispersing aid. The agitated solution was maintained at a temperature between about 190° and 210° F. (e.g., 200° F.) thereby to flash off the benzene solvent and form an aqueous slurry of the chlorinated butyl rubber in water. This slurry was then filtered and the chlorinated butyl rubber, which was in the form of a wet "crumb," was placed in a Proctor and Schwartz tray drier maintained at 180° F. (i.e., 82° C) and dried for 12 hours. The crumb depth on the tray was about ½ inch. The crumb was then completely dried and compacted by milling for 15 minutes on a conventional rubber mill having a roll temperature of 260° F. (i.e., 127° C.)

Example 1

100 parts by weight of an isobutylene-isoprene chlorinated butyl rubber copolymer having a Mooney viscosity (212° F. for 8 minutes) of 58, a mole percent unsaturation of 0.90, a viscosity average molecular weight of 455,000 and containing 1.20 weight percent of combined chlorine were compounded in the absence of sulfur and zinc oxide with 50 parts by weight of HAF carbon black, 1.0 part by weight of stearic acid and the following amounts of the NaOH catalyzed reaction product of 1 mole of 4-octyl phenol with 2 moles of formaldehyde, known as 2,6-dimethylol-4-octyl phenol, and tellurium diethyl dithiocarbamate with the following results when cured for 10, 20, and 60 minutes at 307° F.:

| Component | Parts by weight | | | | |
|---|---|---|---|---|---|
|  | Run A | Run B | Run C | Run D | Run E |
| 4-octyl phenol-formaldehyde reaction product | 3.5 | 3.5 | 3.5 | 9.0 | |
| Tellurium diethyl dithiocarbamate | 1.5 | 1.5 | 1.5 | | 1.5 |
| Cure time @ 307° F. (min.) | 10 | 20 | 60 | 60 | 60 |
| Tensile strength (p.s.i.) | 2,375 | 2,320 | 2,485 | No cure | 665 |
| 300% modulus (p.s.i.) | 1,200 | 1,450 | 1,630 | No cure | 340 |
| Elongation (percent) | 545 | 465 | 405 | No cure | 595 |

The above data show that vulcanizates A, B and C, wherein halogenated butyl rubber was cured in accordance with the present invention by a combination of a polymethylol phenol and a metal thiocarbamate, exhibited superior tensile strengths and extension moduli compared to attempted cures solely by a polymethylol phenol (run D) or solely by a thiocarbamate (run E).

Example 2

The same general procedure as in Example 1 was repeated employing 40 parts by weight of the carbon black, 9 parts by weight of 4-octyl phenol-formaldehyde reaction product and 1.5 parts by weight of various metal thiocarbamates, with the following results when cured at 307° F. for 60 minutes:

|  | Tensile Strength, p.s.i. | Elongation, percent | 300% Modulus, p.s.i. |
|---|---|---|---|
| Zinc diethyl dithiocarbamate | 2,635 | 460 | 1,550 |
| Copper dimethyl dithiocarbamate | 2,135 | 510 | 1,140 |
| Lead dimethyl dithiocarbamate | 1,310 | 610 | 540 |
| Bismuth dimethyl dithiocarbamate | 1,305 | 630 | 530 |

The above data show that a variety of metal thiocarbamates may be used in conjunction with polymethylol phenols to accomplish the purposes of the present invention.

Resort may be had to modifications and variations of the disclosed embodiments without departing from the spirit of the invention or the scope of the appended claims.

What is claimed is:

1. A composition comprising a major proportion of a rubbery halogenated copolymer of about 85 to 99.5 weight percent of a $C_4$ to $C_7$ isoolefin and about 15 to 0.5 weight percent of a $C_4$ to $C_{14}$ multiolefin and a minor proportion of an admixture of a metal thiocarbamate and a dimethylol phenol, said composition being free of added elemental sulfur and zinc oxide.

2. A composition according to claim 1 in which the halogenated copolymer contains at least 0.5 weight percent chlorine but not more than about one atom of chlorine per double bond in the copolymer.

3. A composition according to claim 1 in which the halogenated copolymer contains at least about 0.5 weight percent bromine but not more than about three combined atoms of bromine per double bond in the copolymer.

4. A composition according to claim 1 in which the metal thiocarbamate is present in an amount of between about 0.01 and 15.0 weight percent based on halogenated copolymer.

5. A composition according to claim 1 in which the dimethylol phenol is present in an amount of between about 0.05 and 25.0 weight percent based on halogenated copolymer.

6. A composition according to claim 1 in which the halogenated copolymer is selected from the group consisting of fluorinated, chlorinated, brominated and iodinated butyl rubber.

7. A composition according to claim 1 in which the metal thiocarbamate comprises copper dimethyl dithiocarbamate.

8. A composition according to claim 1 in which the metal thiocarbamate comprises zinc diethyl dithiocarbamate.

9. A composition according to claim 1 in which the metal thiocarbamate comprises tellurium diethyl dithiocarbamate.

10. A composition according to claim 1 in which the dimethylol phenol is 2,6-dimethylol-3-dodecyl phenol.

11. A composition according to claim 1 in which the dimethylol phenol is 2,6-dimethylol-4-octyl phenol.

12. A vulcanized composition according to claim 1.

13. A composition comprising a rubbery polymer having a viscosity average molecular weight of at least about 100,000 comprising atoms of hydrogen, carbon and a halogen selected from the group consisting of fluorine, chlorine, bromine and iodine, containing in its structure a major proportion of hydrocarbon units derived by the polymerization of isoolefins containing about 4 to 7 carbon atoms and also containing sufficient units in which a pair of carbon atoms is linked by an olefinic double bond that the mole percent unsaturation is between about 0.5 and 15; said polymer containing at least about 0.5 weight percent halogen but not more than about one combined atom of halogen per double bond in the polymer; said polymer being in composition with a vulcanizing amount of an admixture of a dimethylol phenol and a Group I to Group VIII metal thiocarbamate; said composition being substantially free of added elemental sulfur and zinc oxide.

14. A composition according to claim 13 in which the polymer contains chlorine.

15. A composition according to claim 13 in which the polymer contains fluorine.

16. A composition according to claim 13 in which the metal thiocarbamate is present in an amount of between about 0.05 and 10.0 weight percent based on the halogen-containing polymer; the amount of dimethylol phenol being between about 0.1 and 20.0 weight percent.

17. A process which comprises vulcanizing the composition of claim 1 at a temperature level of between about 200° and 400° F. for about 2 minutes to 2 hours.

18. A process according to claim 17 in which the halogenated butyl rubber contains chlorine.

References Cited in the file of this patent

UNITED STATES PATENTS

| | | |
|---|---|---|
| 2,356,128 | Thomas et al. | Aug. 22, 1944 |
| 2,701,895 | Tawney et al. | Feb. 15, 1955 |
| 2,804,448 | Hallenbeck | Aug. 27, 1957 |
| 2,809,372 | Frederick et al. | Oct. 8, 1957 |
| 2,926,718 | Baldwin et al. | Mar. 1, 1960 |
| 2,955,102 | Clayton et al. | Oct. 4, 1960 |